United States Patent Office 2,788,278
Patented Apr. 9, 1957

2,788,278

PROCESS FOR TREATING ANIMAL MATERIALS

Leonard J. Zimont and Harold M. Coleman, Chicago, and Ervin W. Hopkins, Hinsdale, Ill., assignors to Armour and Company, Chicago, Ill., a corporation of Illinois No Drawing. Application August 23, 1951,
Serial No. 243,374

4 Claims. (Cl. 99—107)

This invention relates to a process for treating animal materials such as meat, to obtain a more desirable color and external appearance. More particularly, it deals with methods for altering the form or composition of oxygen-bearing meat pigments to produce a desirable red color of lasting duration. This invention further embraces certain pigment compounds formed in the course of the treatment.

Meat contains a number of oxygen-bearing pigments, including myoglobin and hemoglobin, which are compounds of ferro- or ferri-heme and protein. Myoglobin is purplish-red in color, and upon taking up ogygen, it becomes oxymyoglobin which is bright red. Oxidation of oxymyoglobin produces metamyoglobin, which is grayish-brown in color. Similarly, hemoglobin is purplish-red and on oxygenation becomes oxyhemoglobin, which is bright red, and this when oxidized to methemoglobin is grayish-brown. The term "oxygen-bearing pigment" as us_d herein is meant to include the compounds of ferro- or ferri-heme and protein which are capable of taking up or releasing oxygen, and is intended to include such compounds whether they be in their oxygenated or deoxygenated forms.

The difficulty in connection with meat pigments is seen more readily in the case of ground meat. For example, when beef is ground into hamburger, the exterior of the meat is subjected to contact with the oxygen of the air, and the myoglobin of the exterior surface portion is converted to oxymyoglobin which is bright red in color. Upon further exposure of the meat surface to air, oxymyoglobin is oxidized to metamyoglobin which is an undesirable grayish-brown color. The resulting meat mass is unsatisfactory in that it has an unattractive gray-colored exterior. The same unsatisfactory result is found with unground meat in that exterior has an undesirable grayish-brown color.

In U. S. Patents 2,491,646 and 2,541,572 it is disclosed that the grayish-brown pigmentation of meat and globin material may be converted to a desirable bright red color by treating with ascorbic acid. Such ascorbic acid treatment converts metamyoglobin on or near the surface to a bright red oxymyoglobin pigment; likewise, methemoglobin is converted to a bright red oxhemoglobin pigment. Such conversion with ascorbic acid results in an attractive bright red surface, the appearance thereof having a slight orange cast. While this color development is desirable yet it would be even more desirable to obtain a bright red surface having a scarlet hue rather than orange. However, until the present time there has been no satisfactory method of obtaining, for prolonged periods, such a desirable scarlet appearance on the surface of animal materials.

Another difficulty is encountered in the above ascorbic acid method in that while the bright red appearance is obtained for substantial lengths of time, it would be very desirable to have a method of maintaining the desired appearance for even longer periods of time. Such a method, to our knowledge, has not been known, prior to our invention.

An object of this invention is to combine with animal materials, such as meat and globin materials, certain desirable food elements which produce and maintain a scarlet color on the surface of these materials. A further object is to treat meat and globin material such as metamyoglobin and methemoglobin, so as to produce or maintain on the surface thereof a scarlet appearance. Still another object is to treat meat and globin material so as to produce and maintain thereon a scarlet appearance for prolonged periods of time. Other objects and advantages will be apparent as this specification proceeds.

We have found that by treating animal materials with a combination of salt and ascorbic acid, we are able to maintain, on the surface of these materials, a desirable bright scarlet appearance for relatively long periods of time. We have further discovered that the undesirable grayish-brown ferri-heme pigments, metamyoglobin and methemoglobin, may be readily transformed into new scarlet pigments, superior in appearance to pigments heretofore produced, by treating these ferri-heme pigments, as they occur in animal material, with a combination of salt and ascorbic acid. As contemplated in our invention, salt and ascorbic acid are mixed with or applied to the animal material so as to be brought into contact with the globin pigments contained therein. Contact with these pigments on or near the meat surface results in the formation of new pigment reaction products which are superior in appearance to oxymyoglobin and oxyhemoglobin pigments heretofore known.

In treating animal materials the use of ascorbic acid alone results in certain beneficial color effects. The use of salt alone also provides some color benefit. But it is especially striking that the color improvement provided by the combination of salt and ascorbic acid is substantially greater than the sum total of their independent effects. This color improvement is brought about by certain desirable pigment reactions, the nature of which is not well understood at present. Nevertheless, it is thought that the salt and ascorbic acid co-act in some manner to reduce the grayish-brown metamyoglobin to myoglobin which, through presence of the oxygen of the air, is caused to assume the form of a new scarlet oxymyoglobin pigment; a similar effect is had in connection with methemoglobin.

The treatment of animal material with a combination of salt and ascorbic acid provides a further benefit in that the improved color and appearance are maintained for a longer period of time than has been possible through the use of prior methods.

In our perferred method for improving the color of meat, we grind the meat and thoroughly mix quantities of salt and ascorbic acid in with the ground meat so as to assure efficient contact throughout the meat mass. For carcasses, solutions containing salt and ascorbic acid may be injected, preferably into the arteries and veins.

The quantities of salt and ascorbic acid required will vary according to the form of the meat treated and the effective distribution thereof throughout the meat mass. In general, the ascorbic acid is present in the amount of at least 0.01 gram per pound of meat, and the weight of salt is at least 0.5 percent of the meat. We have obtained very good results by employing ascorbic acid in the amount of 100 to 200 mg. per pound of meat in combination with 2 to 4 percent of salt (with respect to the weight of the meat treated). Smaller amounts of the treating materials may be used, but substantial reduction in the amounts results in inferior products. It would not be particularly advantageous with respect to color improvement to increase the quantities of salt and ascorbic acid much beyond the above figures. However, the duration of the color improvement might be prolonged thereby. It is probable that in certain cases where difficulties of distribution are presented, greater quantities of the treating materials may be required.

The time of treatment in accordance with our invention may vary, depending on the rate of diffusion in the form of the meat being treated. Thus, the treatment may be effected within a few hours in the case of ground meat where rapid diffusion is possible. The treatment of whole carcasses may require from a few hours to several days depending upon the efficiency of diffusion through the particular meat specimen.

For the purpose of illustration, the following specific examples are set out:

Example I

Pork trimmings were ground and divided into 1 lb. portions. Salt in concentrations of 0.5, 2.0, and 4.0 percent with and without 200 mg. of ascorbic acid per pound were mixed into the ground pork, and loaves were prepared. A loaf of untreated pork trimmings was also prepared for control purposes. These loaves were enclosed in such a manner that when wrapped in cellophane, one surface was in contact with the cellophane, and another was separated from it by an air space.

The loaves were held for five days at 40° F., and then the color and appearance of the meat surfaces were noted. It was seen that the loaf containing 200 mg. of ascorbic acid and 2% salt had an attractive bright scarlet color, both at the surface under cellophane and at the surface exposed to air. The loaf containing 200 mg. of ascorbic acid and 4% salt was substantially the same color.

At the surface exposed to air, the color of the specimen containing 200 mg. of absorbic acid and 0.5% salt was less bright than that of the previous specimens, and at the surface under cellophane the color was dull red.

The untreated loaf was dull red at the cellophane-covered surface and less bright red than the previous specimen at the surface exposed to air. The appearance of the loaves containing 2 and 4% salt was considerably inferior to that of the specimens containing 200 mg. of ascorbic acid and 2 and 4% salt, particularly at the cellophane-covered surface where the color was dull red (2% salt) and red-brown (4% salt).

The appearance of the meat loaf containing only 0.5% salt was inferior to that of the untreated meat loaf specimen.

Example II

Beef trimmings were ground and mixed with salt (in concentrations of 2.0 and 4.0 percent) and ascorbic acid as in Example I. Loaves were prepared and packaged as above except that the surface of the meat was not exposed to air.

The loaves were held for five days at 40° F., and the color and appearance of the meat surface were then observed.

The specimen having 4% salt and 200 mg. of ascorbic acid was bright scarlet whereas the specimen having the 2% salt combination was very slightly less bright in color. The 4% salt loaf was red in color; the 2% loaf was dull red. The specimen containing ascorbic acid was dark red, and the untreated loaf, looking least attractive, was brown.

While in the foregoing description we have set forth specific examples as illustrative of our invention, it will be understood that such examples may be varied widely by those skilled in the art without departing from the spirit of our invention.

We claim:

1. In a process for improving the color of meat containing a globin material selected from the group consisting of metamyoglobin and methemoglobin, the step of subjecting said globin material to contact with a composition containing as its essential active ingredients a combination of ascorbic acid and salt in the presence of oxygen to produce a reaction pigment of bright scarlet color, said ascorbic acid being present in the amount of at least 0.01 gram per pound of said meat, and the weight of said salt being at least 0.5 percent of said meat.

2. In a process for improving the color of meat containing metamyoglobin, the step of contacting said methyoglobin with a composition containing as its essential active ingredients a combination of ascorbic acid and salt in the presence of oxygen to produce a reaction pigment of bright scarlet color, said ascorbic acid being present in the amount of at least 0.01 gram per pound of said meat, and the weight of said salt being at least 0.5 percent of said meat.

3. In a process for improving the color of meat containing methemoglobin, the step of contacting said methemoglobin with a composition containing as its essential active ingredients a combination of ascorbic acid and salt in the presence of oxygen to produce a reaction pigment of bright scarlet color, said ascorbic acid being present in the amount of at least 0.01 gram per pound of said meat, and the weight of said salt being at least 0.5 percent of said meat.

4. In a process for improving the color of meat containing a globin material selected from the group consisting of metamyoglobin and methemoglobin, the step of contacting said globin material with a composition containing as its essential active ingredients a combination of ascorbic acid and salt in the presence of oxygen to impart to said meat an improved color, said acid being present in the amount of at least 0.01 gram per pound of said meat, the weight of said salt being at least 0.5 percent of said meat.

References Cited in the file of this patent

UNITED STATES PATENTS

| | | |
|---|---|---|
| 2,054,626 | Griffith | Sept. 15, 1936 |
| 2,491,646 | Coleman et al. | Dec. 20, 1949 |
| 2,521,849 | Hopkins et al. | Sept. 12, 1950 |
| 2,541,572 | Coleman et al. | Feb. 13, 1951 |
| 2,553,533 | Komarik et al. | May 15, 1951 |

OTHER REFERENCES

"Food Technology," October 1949, pages 332 to 336, inclusive, article entitled "Antioxidants in the Hemoglobin Catalyzed Oxidation of Unsaturated Fats."